July 11, 1961 M. C. WILLS 2,991,891
TRACTOR MOUNTED LOADING ATTACHMENT
Filed Feb. 11, 1958 2 Sheets-Sheet 1
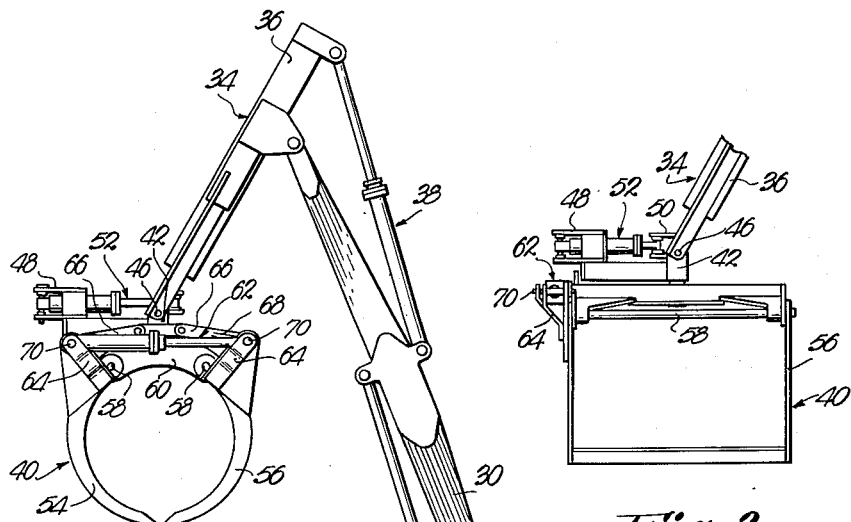
Fig. 2.
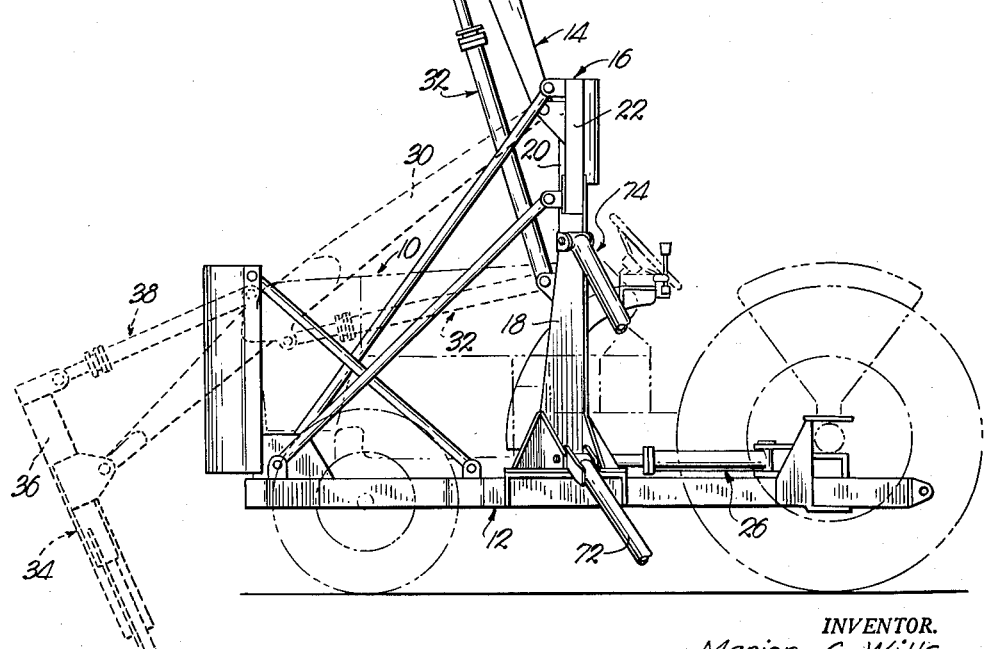
Fig. 1.
INVENTOR.
Marion C. Wills
BY 
ATTORNEY.

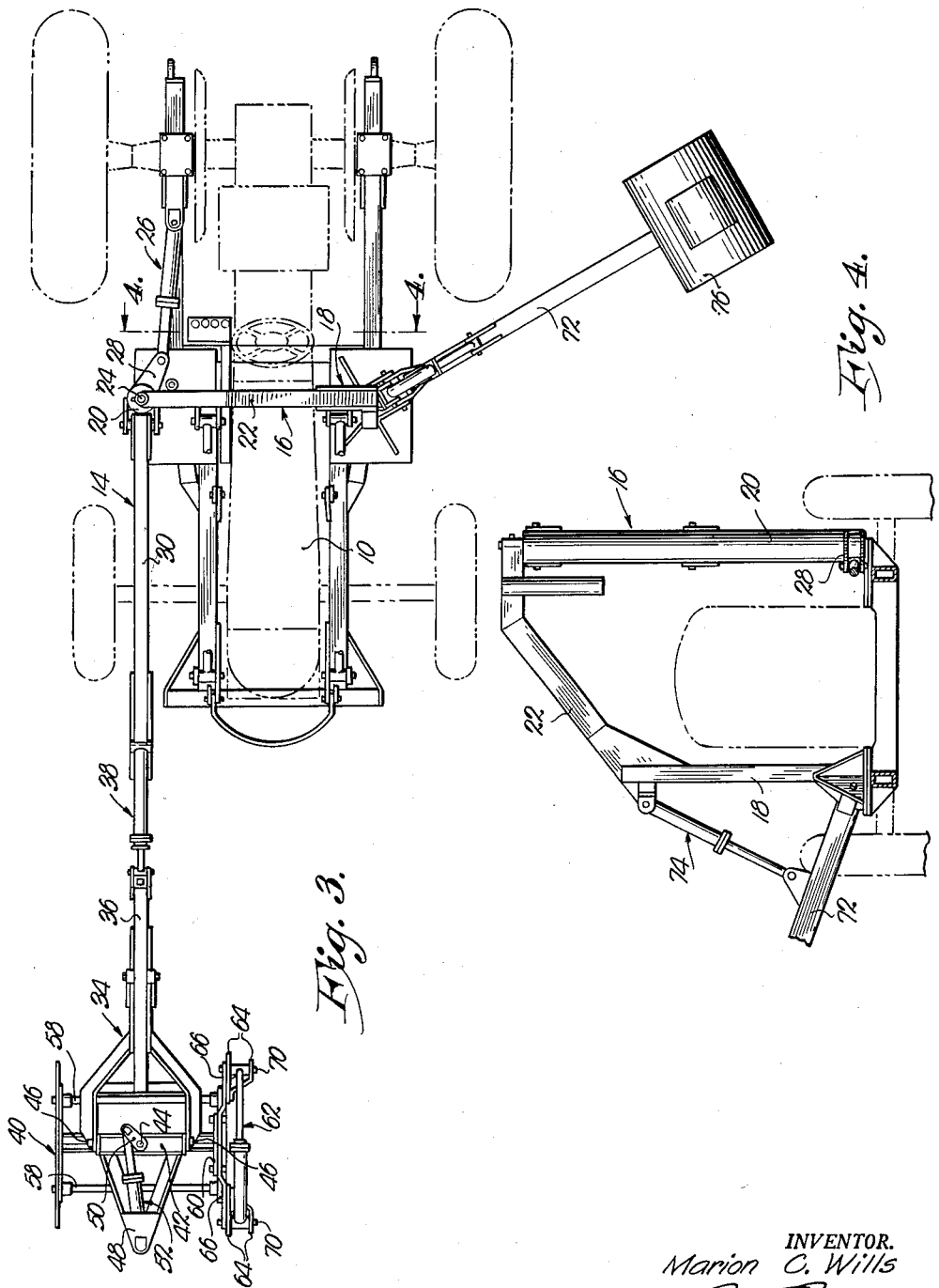

United States Patent Office 2,991,891
Patented July 11, 1961

2,991,891
TRACTOR MOUNTED LOADING ATTACHMENT
Marion C. Wills, Topeka, Kans., assignor, by mesne assignments, to Koehring Company, Milwaukee, Wis., a corporation of Wisconsin
Filed Feb. 11, 1958, Ser. No. 714,560
2 Claims. (Cl. 212—49)

This invention relates to a loader adapted for attachment to a tractor, the primary object being to provide both lateral and vertical swinging movement of material-handling structure in full view of the operator and without interference with the tractor.

Another object of this invention is to permit side mounting by a novel tractor straddling mount also capable of supporting a counterbalance weight at the opposite side of the tractor.

A further object of this invention is to provide a loader attachment operable in confined places permitting carrying of the load through underbrush and around obstacles to a point of loading.

Still another object of this invention is to provide highly maneuverable parts permitting movement of the material-handling structure into a wide range of positions thereby adapting the same to handle virtually any type of material under all extreme adverse operating conditions.

A further object of this invention is to provide a novel grapple.

A still further object of the present invention is the provision of parts which may all be operated through use of hydraulic power under the accurate control of the operator.

In the drawings:

FIG. 1 is a side elevational view of a tractor mounted loading attachment pursuant to the instant invention.

FIG. 2 is a fragmentary, elevational view showing the grapple turned 90° from FIG. 1.

FIG. 3 is a plan view; and

FIG. 4 is a fragmentary, cross-sectional view taken on line 4—4 of FIG. 3.

Tractor 10 has a sub-frame assembly 12 releasably attached thereto carrying loader 14 forming the subject matter of the present invention. A support 16 releasably attached to the frame 12 is in the nature of a loop having a pair of uprights 18 and 20 and a bight 22. Loop support 16 straddles the tractor 10 transversely and intermediate the ends thereof, the bight 22 therefore, being looped over tractor 10.

Tubular upright 20 is rotatable about the vertical axis of an upstanding shaft 24, in turn interconnecting bight 22 and frame 12. A power device 26 pivotally interconnects frame 12 with a lateral arm 28 rigidly secured to upright 20.

A primary boom 30 pivotally secured to upright 20, is raised and lowered by a power lift 32 pivotally interconnecting the boom 30 and upright 20.

Material-handling structure 34 includes an arm 36 pivotally secured to boom 30, arm 36 being actuated by power device 38 pivotally connecting the same with boom 30.

A material receiver 40 on arm 36 is suspended from a bracket 42 for rotation about a vertical axis by means of a pin 44, bracket 42 in turn being freely swingable horizontally about spaced pintles 46 attaching the same to arm 36. Lateral extensions 48 and 50 on bracket 42 and pin 44 respectively, are pivotally interconnected by a power device 52 for rotating receiver 40.

Receiver 40 is in the nature of a grapple having opposed sections 54 and 56 swingable vertically toward and away from each other about shafts 58 in turn carried by bracket 42 through a support 60. A power device 62 pivotally interconnects arms 64 on sections 54 and 56 to swing the latter. Links 66 pivotally interconnect arms 64 and support 60 and each is provided with a slot 68 which clears pivot pins 70 between device 62 and arms 64.

A vertically swingable secondary boom 72 pivotally connected to upright 18 is raised and lowered by a power lift 74 that pivotally interconnects boom 72 and upright 18, a counterbalance weight 76 being mounted on the boom 72.

The power means 26, 32, 38, 52, 62 and 74 are all in the nature of extensible elements such as double-acting, hydraulic piston and cylinder assemblies. Devices 26 and 52 swing horizontally, whereas device 38 and lifts 32 and 74 swing vertically and the device 62 shifts bodily in a vertical plane.

In use, boom 30 may be swung horizontally through a substantially 120° arc from a position in front of tractor 10 to a position extended outwardly in substantial alignment with the rear wheels of tractor 10 by actuation of the device 26.

Grapple 40 may be lowered to the ground to receive many types of materials such as sugar cane, pulpwood and the like which is grasped thereby upon separating the sections 54 and 56 through use of device 62. Grapple 40 may be maneuvered into position for receiving the material by manipulation of any one or all of the power elements except for lift 74.

The material may then be lifted and carried immediately in front of tractor 10 as the latter is driven to a point of unloading. In the event it becomes necessary to travel through underbrush or around obstructions, raising of the boom 72 reduces the over-all width of the assembly since the counterbalance weight 76 is needed only when the grapple 40 is loaded and extended laterally from the tractor 10. At the point of discharge, the various controls make it possible to quickly and easily lift the material to a point where the same may be released from the grapple 40 into a truck or other elevated point of discharge.

Having thus described the invention what is claimed as new and desired to be secured by Letters Patent is:

1. The combination with a four wheel tractor of a subframe assembly releasably attached thereto within the confines of the wheels, said subframe being generally U-shaped and having a pair of horizontal legs, a closed end at the front of the tractor and an open end at the rear end of the tractor; a pair of upright members each fixed to a corresponding leg of said subframe and extending upwardly therefrom intermediate said ends of the subframe; a bight joining the upper extremities of said members, thereby forming a loop, said loop straddling the tractor transversely and intermediate the ends thereof, one of said members having a tube telescoped rotatably thereon; and a hydraulically operated primary boom mounted on said tube adjacent the bight for rotation with the tube and vertical swinging movement relative thereto, whereby the boom may be raised and lowered to and away from the ground when extended laterally of the tractor as well as when the same extends forwardly of the tube in parallelism with the normal path of travel of the tractor.

2. The structure of claim 1 in further combination with a hydraulically actuated counterweight boom pivotally mounted to said subframe and upright member on the opposite leg of said subframe from said primary boom whereby the entire combination is compact and the primary boom and counterweight boom are supported within the confines of the ground support contact of the wheels and the earth.

References Cited in the file of this patent

UNITED STATES PATENTS

| | | |
|---|---|---|
| 1,985,285 | Erdahl | Dec. 25, 1934 |
| 2,637,447 | Holmes et al. | May 5, 1953 |
| 2,725,996 | Britton | Dec. 6, 1955 |
| 2,768,759 | Holopainen | Oct. 30, 1956 |
| 2,833,429 | Shoemaker | May 6, 1958 |
| 2,847,134 | Slate | Aug. 12, 1958 |